June 24, 1930. R. V. WOODWORTH Re. 17,715

MARKING MACHINE

Original Filed June 26, 1926 2 Sheets-Sheet 1

Inventor
Roy V. Woodworth,
by Pippey & Klingeland,
His Attorneys.

June 24, 1930. R. V. WOODWORTH Re. 17,715

MARKING MACHINE

Original Filed June 26, 1926 2 Sheets-Sheet 2

Inventor:
Roy V. Woodworth,
by Pippey & Klingeland.
His Attorneys.

Reissued June 24, 1930 Re. 17,715

UNITED STATES PATENT OFFICE

ROY V. WOODWORTH, OF ST. LOUIS, MISSOURI, ASSIGNOR TO WESTERN SUPPLIES CO., OF ST. LOUIS, MISSOURI, A CORPORATION OF MISSOURI

MARKING MACHINE

Original No. 1,639,360, dated August 16, 1927, Serial No. 118,665, filed June 26, 1926. Application for reissue filed December 3, 1928. Serial No. 323,510.

This invention relates to marking machines for making impressions upon leather and other materials to indicate the outlines for the guidance of subsequent operations.

An object of the invention is to provide a machine for the purpose stated comprising a support for the material or articles to be marked, and a manipulative die supporting device movable from a position to receive a marking substance, such as ink, to a position to press upon the material to be marked and make an impression thereon with the marking substance to indicate the outlines for subsequent operations.

Another object of the invention is to provide a marking machine equipped with means for properly locating and holding the materials to be marked, so that the die will make the proper impressions in proper locations without the requirement of any particular care or attention by the operator after the materials have been located.

Another object of the invention is to provide an improved marking machine having a movable support for the dies, and means for attaching the dies to such support and operating the support and thereby the dies to mark the outlines for subsequent operations upon the materials supported in proper position for that purpose.

Another object of the invention is to provide an improved marking machine having die supporting mechanism, and means facilitating the operation of said mechanism to apply to the dies a proper marking substance and to operate the dies to apply the marking substances to the materials to be marked for subsequent operations.

Another object of the invention is to provide an improved marking device comprising a base member, a member movable relatively thereto and engageable therewith, a guide pattern on said base for receiving the parts to be marked and comprising an element provided with guide elements and removably secured to said base member, and a marking pattern removably secured to said movable member and provided with marking means. An advantage of this construction is that the work locating and supporting devices are interchangeable and removable from the machine, and that the marking devices also are interchangeable and removable, so that materials cut to different shapes and dimensions may be properly located by use of appropriate locating devices and may be properly marked by selected marking devices.

This reissue application includes claims that have been issued to another person on an application that was co-pending with my original application hereof and with my companion application, Serial No. 178,968, and required to be claimed herein if granted to me.

Other objects will appear from the following description, reference being made to the accompanying drawings, in which Fig. 1 is a front elevation of my improved marking machine.

Figure 1:
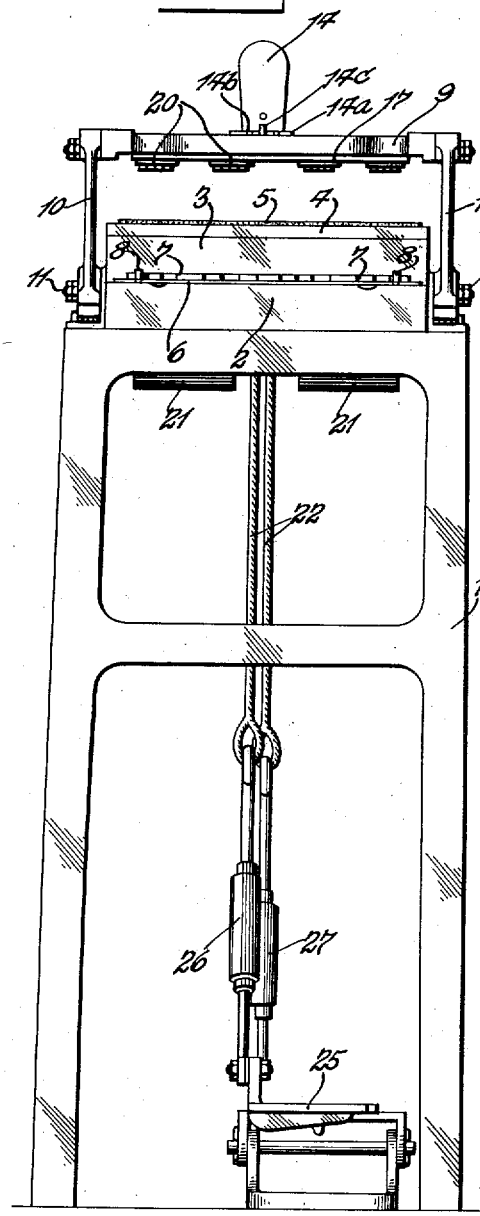
Figure 2:
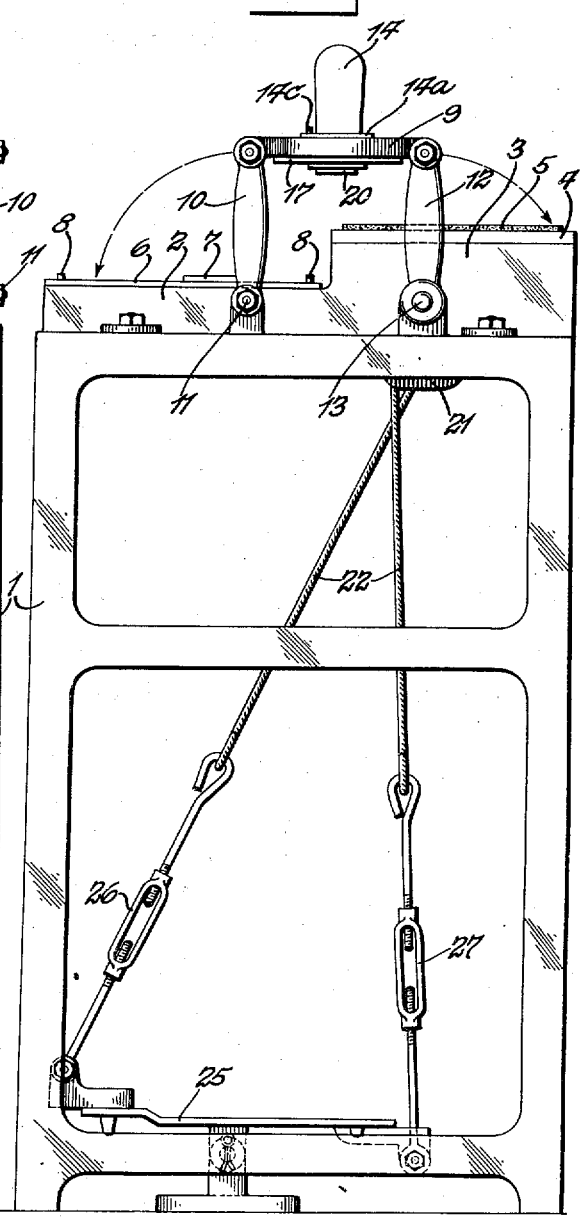
Fig. 2 is a side elevation.
Figure 3:
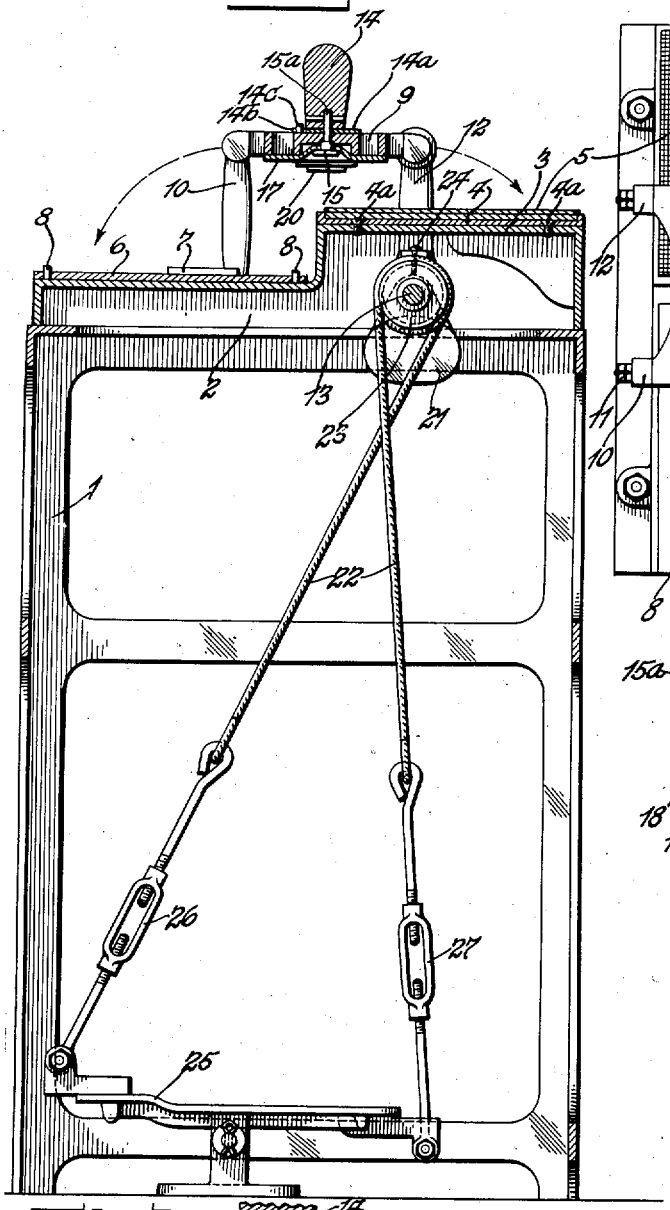
Fig. 3 is a vertical longitudinal sectional view.
Figure 4:
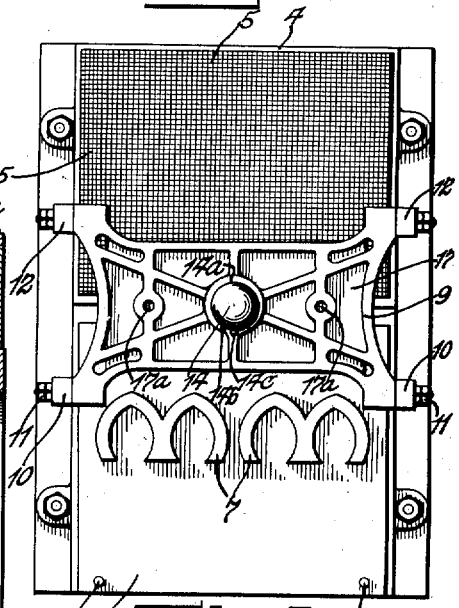
Fig. 4 is a plan view.

My improved machine is constructed and arranged to be mounted upon any appropriate form of support such as the frame 1 which is of sufficient height to support the machine at the proper height for convenient operation.

The machine comprises a base which, in the form shown, includes a die supporting portion 2 at the front and a marking substance supporting portion 3 at the rear. As shown, the means for applying a marking substance to the dies comprises a pan or tray 4 designed and arranged to contain a quantity of ink and an ink pad 5. The pan 4 may be secured to the base by screws 4[a].

The work locating and supporting devices are interchangeable and removable from the machine, so that materials cut to different shapes and dimensions may be properly located by the use of an appropriate specially designed locating device. Each of such locating devices, one of which is shown, comprises a gage plate 6 having on its upper side forms 7 to receive marginal or projecting portions of the materials to be marked and thus expedite and facilitate proper location of the materials for operation of the marking device. Each of said plates 6 is provided with a number of holes arranged to receive pins 8 extending from the frame supporting part 2 and thus hold the plates 6 immovable in proper location.

The die carrier comprises a frame 9 swingingly supported by a pair of front arms 10, the upper ends of which are pivoted to the lateral ends of the die carrier and the lower ends of which are connected to the base by pivots 11, and a pair of rear arms 12 having their upper ends pivoted to the die carrier 9 and their lower ends attached to a rock shaft 13 extending across the machine below the pad pan 4. A handle 14 is connected with the die carrier 9 by the stem 15[a] and die lock or clamp arm 15 passing through the die carrier 9 and anchored in the handle, whereby a turning connection of the handle with the die carrier is obtained. The lock or clamp arm 15 is within a recess 16 in the under side of the die carrier and is operative by the handle 14 to engage and secure the die plate to the die carrier. The extent of turning movements of the handle 14 is limited by a disc 14[a] attached to the handle and provided with a notch 14[b] in one edge into which a pin 14[c] extends. The pin 14[c] is rigid with the die carrier and the notch 14[b] is of sufficient length to permit the handle 14 and the clamp or lock 15 to be turned approximately one-fourth of a revolution.

Figure 5:
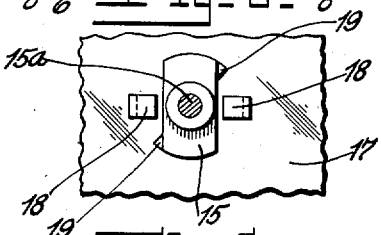
Fig. 5 is a detail view of the die clamping device.
Figure 6:
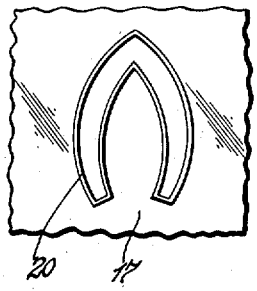
Fig. 6 shows a specimen of die marker, although it will be understood that various shapes, designs and forms of die markers may be used on this machine.
Figure 7:
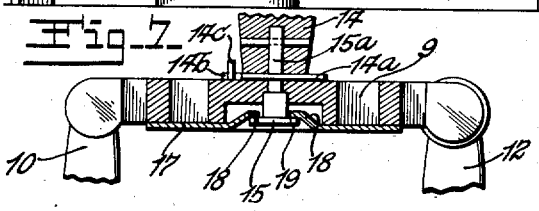
Fig. 7 is a detail view of the stop for the die lock.

The machine is arranged to receive die plates having marking dies of different designs adapted to mark the materials placed on the gage plate for subsequent work or operation. One such die plate 17 is shown and is provided with a pair of spaced projections 18 arranged to extend upwardly into the recess 16 so that the ends of the die lock or clamp arm 15 may engage under the projections 18 to secure the die plate to the carrier. Each die plate 17 also has a number of upwardly projecting lugs 17[a] arranged to engage in holes in the die carrier to locate the die plates properly and to cooperate with the lock or clamp arm to hold the die plates rigid on the carrier. The edges 19 (Fig. 5) of the die lock or clamp arm 15 are beveled so that they readily pass under the projections 18 and, by further turning of said arm, will clamp the die plate firmly in connection with the carrier. The under side of the die plate 17 is provided with marking dies 20 of proper configuration and design, so that when the machine is operated the material on the gage plate will be marked properly thereby. This machine may be readily operated by hand by use of the handle 14 to swing the die carrier successively from the ink pad 5 to the pieces of material successively placed on the gage plate; or, the machine may be operated by a treadle device.

As shown, a number of counterbalance weights 21 are rigid with the shaft 13 in a relationship in which said weights tend to support the die carrier in an intermediate position between the pad 5 and the gage plate for movement in either direction. The treadle connections comprise a treadle cord 22 extending over and attached to a pulley 23 rigid with the shaft 13. The cord 22 may be held from slipping on the pulley by a clamping device 24 holding the cord 22 in clamped connection with the pulley. The cord 22 crosses below the pulley 23 and has one end connected to the forward end of a treadle 25 by a tensioning device 26, and the opposite end connected to the rear end of the treadle by a tensioning device 27. The tensioning devices are operative to take up the slack in the cord resulting from continued use of the machine. Rocking of the treadle in one direction will swing the die carrier to inking position and in the opposite direction will swing the die carrier to marking position. When both the treadle and the handle 14 are released the counterbalance weghts 21 raise the die carrier to intermediate position ready for further operations.

It is now clear that the arms 10 and 12 support the die carrier 9 for swinging movements from and to the inking element 5 and the shoe parts located on the gage device 6, and that the actuator 14 for the die carrier is wholly supported thereby. The carrier 9 is equipped with means 15 and 17[a] for locating and supporting dies of different selected designs in exact predetermined locations. The means 15 and 17[a] perform the double function of exactly locating the dies in proper predetermined positions on the die carrier for operation to mark the shoe parts which are located and gaged by the gages 7, and also supporting and preventing the dies from becoming displaced in any way while the dies are in connection with the carrier.

This machine meets an existing need by greatly expediting and reducing the cost of operations, and also by producing the markings in the precise relationship desired.

The machine may be manufactured without great cost and operated by unskilled operators. Numerous variations in the construction and arrangement may be made without departure from the nature and principle of the invention. I do not restrict myself in unessential particulars, but what I claim and desire to secure by Letters Patent is:—

1. A machine of the character described comprising a support, arms pivotally supporting said support for swinging movements to and from the work, a device attached to certain of said arms for moving said support from the work, a handle for swinging said support to and from the work, a die plate for making impressions upon the work, and means in connection with said handle for holding the die plate in connection with said support.

2. A machine of the character described comprising a support for the material to be marked, a gage for positioning the material on the support, a marking substance container, a swinging frame, a device for operating said frame from said container to the material on said support, automatic means for moving said frame to an intermediate position between said container and said support, a marking die for carrying marking substance from said container to the material on said support, and clamping means controlled by said device for holding said marking die in connection with said frame.

3. A marking machine comprising a support for the material to be marked, a gage device for locating the material on said support, a marking substance container, a frame pivotally supported for swinging movements from said container to the material on said support, a die for transferring marking substance from said container to the material on said support, and means for operating said frame as aforesaid for holding said die in connection with said frame, and automatic means for moving said frame to an intermediate position between said container and said support.

4. In a machine of the character described, a swinging frame, automatic means for moving said frame to a single starting position, a handle for swinging said frame, a plate, a die supported by said plate, and a clamping device operative by said handle to engage and release said plate.

5. A marking machine comprising a gage for the work to be marked, a marking substance container, a swinging frame, a plate, a die in connection with said plate, a handle for swinging said frame, a clamp device controlled by said handle for holding said plate in connection with said frame, and automatic means for holding said frame in a position between and out of contact with both said container and said gage.

6. A marking machine comprising a support for the material to be marked, a gage device for locating the material on said support, a marking substance container, a rock shaft, a pair of arms attached to said rock shaft, an additional pair of pivoted arms, a frame supported by all of said arms, a marker, means for holding the marker in connection with said frame, and means in connection with said rock shaft for rocking said shaft and thereby operating said frame to cause said marker to transfer marking substance from said container to the material in connection with said gage.

7. A marking machine comprising a support for the material to be marked, a marking substance container, a rock shaft, a pair of arms attached to said rock shaft, an additional pair of pivoted arms, a frame supported by all of said arms, a marker, means for holding the marker in connection with said frame, means in connection with said rock shaft normally holding said shaft in a single starting position and operative to move said rock shaft to said position from the material and from said support, and means in connection with said rock shaft for rocking said shaft and thereby operating said frame to cause said marker to transfer marking substance from said container to the material on said support.

8. In a machine of the character described, a swinging frame, a handle for swinging said frame, a device holding said handle in connection with said frame and permitting turning movements of said handle, a plate, a die supported by said plate, a clamping element in connection with said device and operative thereby to engage and release said plate, and automatic means for holding said frame in a single starting position.

9. In a machine of the character described, a swinging frame, a handle for swinging said frame, a device holding said handle in connection with said frame and permitting turning movements of said handle, means limiting extent of turning movements of said handle, a plate, a die supported by said plate, a clamping element in connection with said device, and projections on said plate engageable by said clamping element when said clamping element is turned to one position from a starting point and releasable from said clamping element when said clamping element is turned to its starting point.

10. A marking device for shoe parts and the like, comprising a base member, a member movable relatively thereto and engageable therewith, a guide pattern on said base for receiving the parts to be marked, said pattern comprising a card provided with guide elements and removably secured to said base member, and a marking pattern removably secured to said movable member and provided with marking means.

11. A marking device for shoe parts and the like, comprising a base member provided with a removable pattern having guide elements thereon for receiving said parts, a swinging member hinged to said base member and likewise having a removable pattern, said last named pattern being provided with means for marking said parts while on said guide pattern and when closed upon said base plate.

12. A device for marking shoe parts and the like, comprising a support for the parts to be marked, an element for containing a marking substance, a gage on said support for the parts to be marked, a die carrier, means for locating in exact predetermined positions and detachably supporting on said carrier dies of different selected designs, and arms for supporting said die carrier for swinging movements between said support for parts and said element.

13. A device for marking shoe parts and the like, comprising a support for the parts to be marked, means for locating in exact predetermined positions and detachably securing to said support gages of different selected designs for different designs of parts to be marked, an element for containing a marking substance, a die carrier, means for locating on said carrier in exact predetermined positions with respect to the different selected gages and supporting in connection with the underside of said carrier different selected dies for operation on different classes of work, and pivoted arms supporting said die carrier for swinging movements between said element and said support and preventing said carrier from moving any dies that are in connection with said carrier out of parallel relationship with the plane of said support.

14. A marking device comprising two members, one adapted to move toward and from the other, removable patterns in connection with said members, one of said patterns guiding the parts to be marked and the other carrying marking devices, and means for permanently supporting different selected patterns in an exact predetermined relationship with each other and preventing said patterns from moving out of parallel relationship.

15. A marking device for shoe parts and the like, comprising co-acting members adapted to be closed one toward the other, carrying removable patterns between which said parts are received and marked when said members are moved toward each other, means for locating and holding said patterns respectively in a predetermined relationship with respect to each other, and means for controlling said members positively to prevent said patterns from moving out of exact predetermined relationship with each other.

16. A device for marking shoe parts and the like comprising a support, means for locating and holding in fixed positions on said support selected gages for selected classes of work, a die carrier, means for locating and holding in connection with said carrier in exact predetermined positions with respect to the selected gages dies of different selected designs, and arms for supporting said die carrier for swinging movements toward and away from the work at said gages.

ROY V. WOODWORTH.